United States Patent [19]

Kononov

[11] Patent Number: 4,881,176

[45] Date of Patent: Nov. 14, 1989

[54] FILTER ANALYZING SYSTEM

[76] Inventor: Anthony Kononov, Church Rd., Box 162, Sumneytown, Pa. 18084

[21] Appl. No.: 147,331

[22] Filed: Jan. 22, 1988

[51] Int. Cl.$^4$ .................. G06F 15/46; G01M 3/20
[52] U.S. Cl. ............................ 364/500; 55/97; 55/271; 73/38; 210/85; 364/502
[58] Field of Search ............. 364/468, 500, 502, 510; 73/38, 40, 40.7, 45.2; 210/85, 143, 295, 501, 339, 433.2, 359; 55/97–99, 259, 270–274, 279, 282, 285, 301

[56] References Cited

U.S. PATENT DOCUMENTS

| | | | |
|---|---|---|---|
| 4,128,004 | 12/1978 | Caron | 73/38 |
| 4,449,392 | 5/1984 | Huschke | 73/40 |
| 4,515,007 | 5/1985 | Herman | 55/97 X |
| 4,614,109 | 9/1986 | Hofmann | 73/38 |
| 4,701,861 | 10/1987 | Kauke | 364/502 |

Primary Examiner—Joseph Ruggiero
Attorney, Agent, or Firm—Joseph W. Molasky & Assocs.

[57] ABSTRACT

An in situ apparatus and method to clean filter housing and related piping, sterilize and perform integrity testing of a filter for purifying a gas or liquid to be used within various industrial environments such as chemical, pharmaceutical, food processing or semiconductor manufacture. The in situ facility of the filter apparatus in the manufacturing environment is automatically performed by use of an electrical controller which enables the method of operation to be executed in a desired sequence.

28 Claims, 6 Drawing Sheets

FILTER ANALYZING SYSTEM

BACKGROUND OF THE INVENTION

1. Field of the Invention

The present invention relates in general to the field of filter performance in a manufacturing environment, and in particular, relates to the field of conditioning and generating an automatic evaluation in situ of a filter prior to becoming operational in an industrial production facility.

2. Description of the Prior Art

A recognized insufficiency of known prior art filter conditioning and evaluation process apparatus in industrial manufacturing has been that it is tedious, labor intensive, prone to human error and in addition, the filter apparatus must be located in a clean room environment. The tediousness and labor intensity that is developed in prior implementation is amply demonstrated by the use of free-standing facilities for sterilizing and determining the capability of the filter prior to conducting production runs. In the employment of such separate facilities, operating or maintenance personnel are initially required to physically transport the filter or filter and filter housing combination for sterilization. The problem engendered by the physical transport and handling of the filter is that contamination can easily occur to the detriment of the eventual product being produced, for example, during the purification of sterile pharmaceutical products. The shortcomings of the prior art are compounded upon transporting the filter to another facility for integrity testing where it is determined whether the filter's internal structure is integral in all respects. Due to the complexity of conducting integrity testing, personnel are vulnerable to making errors especially when different operators perform such testing as in shift work. It is abundantly clear from the above therefore that filter conditioning and evaluation prior to industrial use is a critical but nevertheless an expensive and onerous task for managers, particularly in view of the high standards that are now being demanded by state and federal governments as well as by the public-at-large in products that affect health and human welfare.

In addition to the above stated imperfections of existing apparatus and techniques another serious limitation is the extensive labor requirement for transporting, cleaning, sterilizing and integrity testing the filter or filter and filter housing combination. In view of both domestic and worldwide competition it is a present day requirement that production facilities have efficient operations and the prior art is totally deficient on this matter as presently existing. The present invention has obviated these shortcomings by providing automatic and in-place sterilizing and integrity testing including cleaning as an integral component to the production facility. Accordingly, production efficiency is improved, error and labor intensiveness is eliminated by virtually eliminating the human factor. As a result of the competitive aspects of the system devised by the present invention superior production results and concomitant profits are generated.

It is therefore an object of this invention to provide a new industrial capability for automatically conditioning and testing filters in situ for purifying and sterilizing a liquid or gaseous product in any manufacturing environment.

SUMMARY OF THE INVENTION

The present invention is comprised of an apparatus and method for automatically performing in place integrity testing of a filter employed to screen contaminants from a gas or liquid for use in a manufacturing facility, and it removes the requirement for locating the filter apparatus in a clean room environment. Integrity testing consists in performing tests to ascertain whether microscopic cellular construction of the filter is without defect and can prevent impurities from entering into the manufacturing process. Prior to executing integrity testing the filter may be automatically sterilized in-place which is mandatory in certain industrial environments, for example, food and drug manufacturing. The apparatus also includes the capability of automatically cleaning in-place certain associated filter hardware after the previously used filter is discarded and prior to replacement with the new filter. Cleaning in-place is a necessity where the gas or liquid leaves a residue in the filter housing and connected piping. Integrity testing, sterilizing and cleaning in-place in accordance with this invention may be automatically performed singly, in various combinations or in totality.

The performance versatility of the disclosed in situ apparatus and method is achieved under control of a microprocessor which receives converted analog input information such as pressure, temperature and conductivity for computer evaluation. The microprocessor also evaluates certain digital information from a plurality of switches which cooperate with associated valves controlling the apparatus. In the selective evaluating of the various input parameters, the microprocessor automatically produces output signals which control the performance of the apparatus in order to execute in specified sequence the cleaning, sterilizing and integrity testing in-place.

Accordingly, the invention has been devised primarily to provide purity or sterility of the gas or liquid product which is utilized in the industrial process. The virtual elimination of the contaminant in manufacturing is not only a primary goal but it is achieved herein without being labor intensive with a minimization of human error and tedium as well as without need of a clean room environment.

DESCRIPTION OF THE PREFERRED EMBODIMENT

Figure 1:
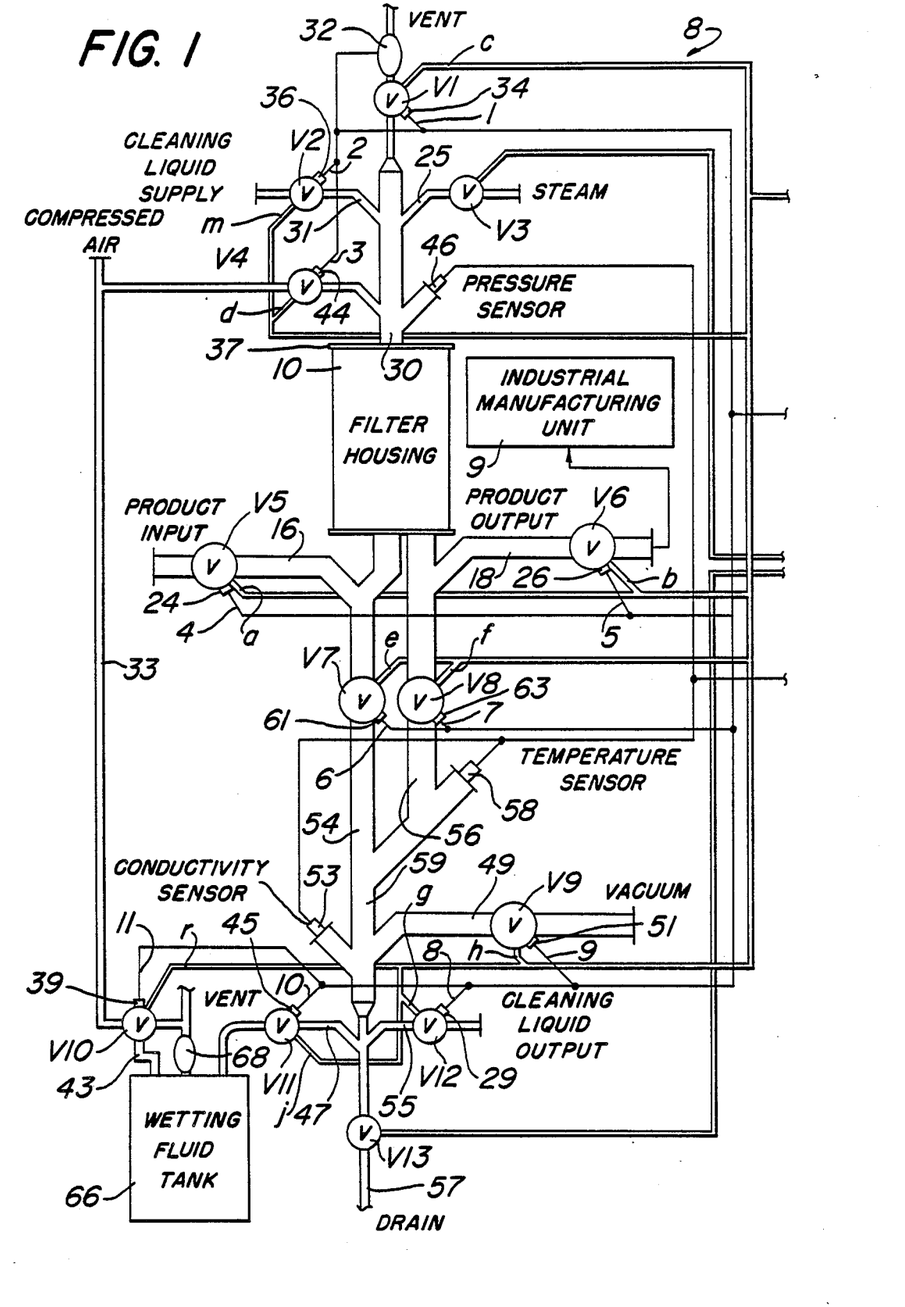
FIG. 1 is a view of a mechanical schematic arrangement depicting the system apparatus of the invention for cleaning, sterilizing and integrity testing.
Figure 1A:
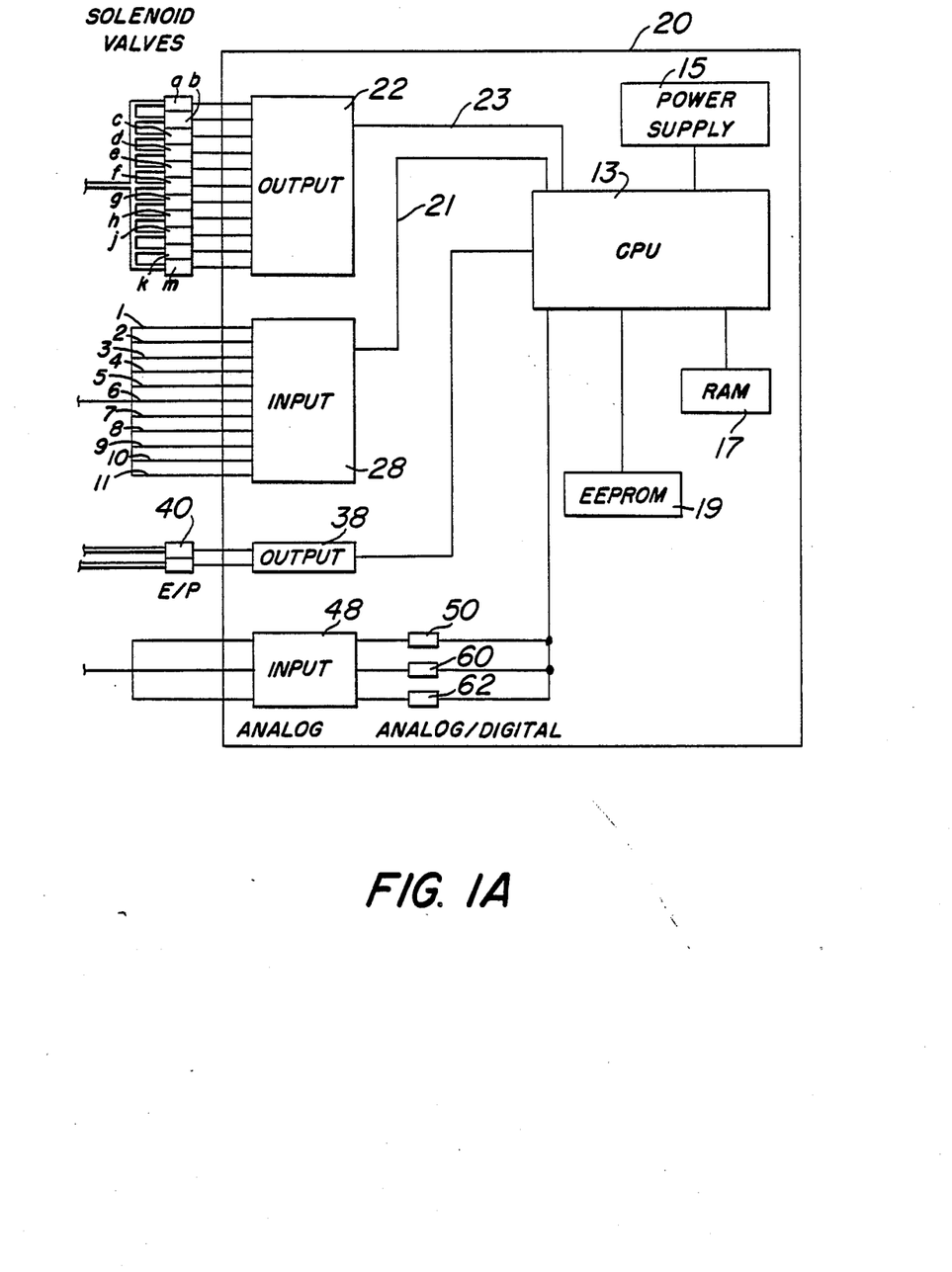
FIG. 1A is a view of a electrical schematic showing the microprocessor for automatically and sequentially controlling the apparatus of FIG. 1.

Referring in detail to the mechanical and electrical schematic of FIGS. 1 and 1A, there is shown the system apparatus 8 of the invention for analyzing in situ a filter which is instrumental in sterilizing or purifying a gas or liquid to be used in production within an industrial manufacturing unit 9. In situ signifies that the filter apparatus 8 of this invention is directly connected and is integral with the industrial manufacturing unit 9 which utilizes its sterilized or purified product output. The filter is contained within a housing 10 and is connected with the manufacturing unit 9 such as a pharmaceutical facility where, for example, sterilized air is employed in its manufacturing processes after it emanates from pipe 18 and the Product Output Side. Unsterilized air or any other gas or liquid product enters the filter housing 10 for filtering through a pipe 16 and a Product Input side from a supply source (not shown). The pore diameter of the filter cellular construction, as an example, may be 0.2 microns or two ten millionths of a meter in diameter, which is sufficient to prevent passage of bacteria and virus into the filtered Output Product. The Product Input and Output Sides are controlled by pneumatically actuated valves V5, V6. The valves used in the apparatus 8 may be either ball or diaphram types entirely, or a mix of both without causing diminution of results attained by this invention. The pneumatic valves V5, V6 are actuated by solenoid members (a), (b) under control of digital signals received at output terminals 22 upon generation along line 23 by CPU 13. The actuated or unactuated condition of the valves V5, V6 is determined by respective microswitches 24, 26 which are coupled to the respective valve mechanisms, and are in an ON-OFF state depending upon the status of the valve. The ON-OFF state of the microswitches 24, 26 is monitored by CPU 13 through digital input signals sent along lines (4), (5) to input terminal 28 and are received by CPU 13 from line 21.

In the embodiment of the invention, the bottom of the housing 10 is sloped to allow for facile drainage and removal of any condensate that may have accumulated.

The CPU 13 of the microcontroller 20 that receives status information from microswitches in conjunction with other supporting electrical devices performs high speed computing to automatically initiate, monitor and control various cycles of operation disclosed by this invention. The CPU 13 includes a conventional power supply 15, a RAM or random access memory 17 and an EEPROM or electrically erasable programmable read only memory 19. The RAM 17 is used to store various arithmetic constants and algorithms that are employed to calculate set points needed to automatically enable the system apparatus 8 to function in accordance with the disclosed invention; similarly, a microcode is resident in the EEPROM 19 for storing detailed computer instructions to enable the controller 20 to execute the various cycles of the process within designated time frames. Since the EEPROM 19 is electrically erasable, the cycles of operation may be readily changed by its operators and as dictated by circumstances. As an example, the invention may function in a cyclic mode that allows automatic cleaning in place (CIP), sterilizing in place (SIP), and integrity testing in-place (IT) as consecutive cycles of the system. However, the apparatus 8 may be modified through a change in the microcode to perform only IT, or a combination of SIP and IT as required by the operation of the industrial manufacturing unit 9 being supplied with sterilized or purified gas or liquid. The CPU 13 receives input data through terminal 28 and line 21 from various microswitches as was briefly discussed with respect to control valves V5, V6; also, analog input information is received from terminal 48 after being modified by analog-to-digital converters 50, 60, 62. The output signals generated by the CPU 13 are received at the output terminals 22 through line 23 for controlling various pneumatic valves of the apparatus 8.

A third pipe member 30 extends from a top elevation of the filter housing 10 through lid 37 and leads directly to a pneumatically operated valve V1. The valve V1 is energized by solenoid valve (c) that in-turn is activated by a digital signal from CPU 13 through output terminal 22. The pneumatic valve V1 is coupled to a check valve 32 for venting or bleeding air out of the system; however, the vent 32 will not allow fluid to escape when the apparatus 8 performs upon such a type product. The ON-OFF status of the valve V1 is continually monitored electrically by the CPU 13 through line 21 from the input terminal 28 and line (1) connected to the microswitch 34. The pipe member 30 is also coupled through a connecting pipe 31 to a pneumatic valve V2 under control of solenoid (m) employed to control a Cleaning Liquid Supply such as a detergent for internally cleansing the filter housing 10 and interconnected piping after a filter has been removed. The Cleaning Liquid is of a strength sufficient to remove any residue that may be accumulated in the sterilization or purifying of the gas or liquid in a previous phase of operation. As will be detailed in later paragraphs, the valve V2 together with other appropriate apparatus under governance of the microcontroller 20 provides the automatic CIP after a filter has been removed from housing 10 because it no longer is useful, for example, it may be unable to remove bacteria and virus. The energized or unenergized status of the valve V2 is monitored by the CPU 13 which receives digital data from line 21 connected to input terminal 28; status information transmitted to terminal 28 is received from microswitch 36 through line (2). It should be understood that although only a single Cleaning Liquid Supply is shown on the drawing several detergents and rinses may be readily accommodated by the invention depending upon the gas or liquid product being sterilized or purified.

A valve V3 employed to control a supply source of saturated steam is additionally connected to the pipe member 30 through connecting pipe 25. The valve V3 is energized by a proportional controller 40 that is activated by the output from CPU 13 through terminal 38. The operation of the proportional controller 40 depends upon a voltage level produced by the CPU 13 in a manner whereby the higher the output voltage generated, the greater the amount of steam that is permitted into the system and the higher the temperature produced. The saturated steam supply under control of proportional valve V3 automatically provides SIP to the internal piping and filter located within housing 10. The CPU 13 develops an output signal at terminal 38 which is coded as a result of performing the appropriate algorithm which will cause proportional controller 40 to produce the necessary output voltage for proper operation of valve V3. In addition, valve V13 may be operated by the microcontroller 20 in conjunction with valve V3 to insure that sufficient steam remains within the various pipes and housing 10 to complete SIP.

A Compressed Air Supply required for IT and for proper performance of certain clean and rinse cycles during operation of the apparatus 8 is also an adjunct of the pipe member 30, and its control is achieved through pneumatic valve V4 by energizing solenoid valve (d) from output line 23 of CPU 13 through output terminal 22. CPU 13 monitors the status of valve V4 through line (3) connected to microswitch 44 and through terminal 28. The Compressed Air Supply provides momentum to a wetting agent supply 66 for use when a filter is placed in housing 10; the Compressed Air is also utilized during IT and during certain clean and rinse cycles as will become apparent in later discussion. A final component extending from the upper pipe member 30 is a sensor or probe 46 for measuring the pressure at various times within the system during the execution of the in situ operation as disclosed in this invention, and it provides an appropriate analog signal which is received by the CPU 13 at input terminal 48 of controller 20. The analog input signal is translated into a digital signal by an analog-to-digital converter 50 for utilization by the CPU 13.

With reference now to the base of the filter housing 10, left and right oriented pipes 54, 56 are respectively connected to the input and output product lines 16, 18. Opening and closing of the pipes 54, 56 are controlled by pneumatic valves V7, V8 and are actuated by solenoid valves (e), (f) from the signal produced by CPU 13 at output terminal 22 as transmitted from line 23. In a manner previously described, the ON-OFF status of valves V7, V8 is sampled by CPU 13 through lines (6), (7) from microswitches 61, 63 and applied to input terminal 28 and CPU 13 through line 21. At a juncture of the left and right input pipes 54, 56, there is located a probe 58 which includes a sensor for producing an analog signal of the temperature within the system which is applied to CPU 13 by way of input terminal 48 and an analog-to-digital converter 60. Connected downwardly from the jointure of pipes 54, 56 and temperature probe 58 is a pipe 59 that joins to a drain 57. The drain 57 is operated under control of valve V13 and by proportional controller 40; the controller 40 is activated by the voltage level produced by the CPU 13 at output terminal 38. As previously stated, the valves V13 and V3 operate in conjunction with one another in order to control the temperature level of the system by allowing more or less steam within the piping and housing 10. Valve V13 may also be fully open during various drain cycles.

An additional valve V12 is positioned in pipe leg 55 connected to downwardly directed pipe 59 and is under control of solenoid valve (g) and CPU 13. Valve V12 is operated in conjunction with valve V2 to enable the automatic CIP function to be carried out by allowing the cleaning solution to be eliminated from the system after the housing 10 and its associated piping has been cleaned; and, the energized or unenergized state of valve V12 is monitored by CPU 13 by sampling the ON-OFF status of microswitch 29 through line (8) which is received at input terminal 28. Further positioned in pipe 59 is a conductivity probe 53 which produces an analog output signal which is applied to the CPU 13 through input terminal 48 and analog-to-digital converter 62. The conductivity probe 53 is utilized in the system provided by apparatus 8 in order to sense whether there is any electrical conduction through any residual fluid. A pipe 49 is also elbowed into descending pipe 59 for locating pneumatic valve V9 which controls a Vacuum Source by means of solenoid valve (h), which is under control of the CPU 13 through output terminal 22; and as in a before mentioned manner, the valve V9 is monitored by the CPU 13 through the status of a microswitch 51 and is sampled via line (9) at input terminal 28. The Vacuum Source is a requisite component of the system for drying the internal walls due to any moisture or particles that remain in the piping from the previous operation. The Vacuum Source is also used during the SIP cycle of the system.

Further connected to the descending pipe 59 is a pipe 47 whose flow is controlled by pneumatic valve V11 through solenoid (j) and its state of operation is indicated by the corresponding status of microswitch 45. The microswitch 45 is monitored by sampling a signal from line (10) which is received by CPU 13 at terminal 28 from line 21. The valve V11 controls the output of a wetting agent supply 66 such as alcohol that is used when a filter is positioned in housing 10. The input line 43 to the wetting agent supply 66 is controlled by pneumatic valve V10 through solenoid (k) for allowing passage or non-passage of Compressed Air from line 33 to allow transfer of the wetting agent to the housing 10. The ON-OFF status of microswitch 39 coupled to valve V10 respectively transfers the energized or unenergized state of the valve to CPU 13 through lines 11, 21 and input terminal 28.

Figures 2A, 3:
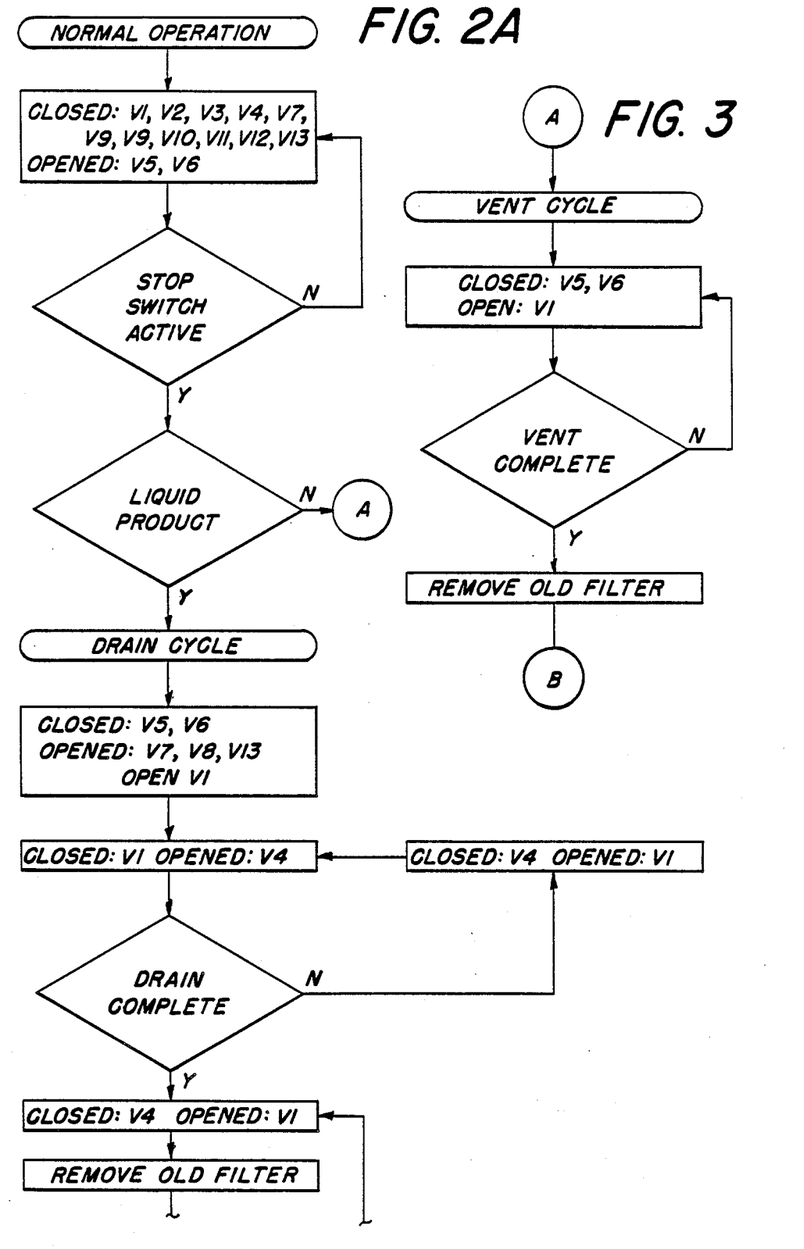
FIG. 2A, 2B, 2C and 2D are views of a flow chart which illustrates in a sequential manner the steps for achieving automatic cleaning, sterilizing and integrity testing of a filter in a filter apparatus for purifying a gas or liquid.
FIG. 3 is a view of a flow chart which illustrates the sequential steps of the system when the product to be filtered is a gas.

Reference is now made to the flow chart of FIG. 2A, which represents the typical various steps and, in essence, a higher computer language that is automatically performed by the microcontroller 20 in controlling the in situ filter analyzer system of this invention. The operation begins in a normal mode of the apparatus 8 where product valves V5, V6 are open and the remaining valves V1, V2, V3, V4, V7, V8, V9, V10, V11, V12 and V13 are closed. In the normal operating mode, the non-sterile or impure gas or liquid is filtered within housing 10 after it enters the Product Input Side and the sterilized or purified product exits from the Product Output Side to be utilized by the integrally connected manufacturing unit 9. During the normal operation of the system no other activity occurs and all of valves except valves V5, V6 are in a closed state. A diamond located on the flow charting represents a decision point for the microcontroller 20. Switching functions that are shown in the flow charting may be physically operated or under microcode control. The decision point following the opening of valves V5, V6 allows two alternatives, namely, if the stop switch is programmed as being inactive the microcontroller 20 causes the apparatus 8 to continue functioning under normal operation; the other alternative indicates that if the stop switch is active, the system steps to a second decision point where the microcontroller 20 is programmed for executing its operation upon either a gas or liquid. If the product to be sterilized is not a liquid the microcontroller 20 transfers the system to A for a vent cycle as indicated in the flow chart of FIG. 3; however, if the product for sterilization or purification is a liquid, a drain cycle is initiated.

Upon initiation of the drain cycle, valves V5, V6 are closed to prevent any further filtering of the product, and valves V7, V8 and V13 are opened to allow discharge of any previously present liquid by gravity through the drain 57 by way of pipes 30, 54, 56 and 59. After a designated time period has elapsed the valve V1 is opened to allow air at atmospheric pressure to enhance the speed of liquid drainage out of the system through the air bleed vent 32. Although the automatic air vent 32 will not permit liquid to pass it is not deemed advisable to open valve V1 at the initiation of the drainage cycle to prevent the product from entering an orifice of the bleed vent. After a certain time period, the valve V1 is closed and valve V4 is opened to allow Compressed Air to augment elimination of any residual liquid in the pipes through the drain 57. A decision point is reached after initial closing of valve V1 and opening of valve V4 if draining has been completed as determined by microcontroller 20 based upon the signal produced by the pressure sensor 46. If drainage is not complete the microcontroller 20 causes valve V4 to close and valve V1 to open to again allow atmospheric pressure to abet removal of liquid from the system. This cycle will be repeated until drainage is completed after which valves V1 and V4 are respectively opened and closed. The opening of valve V1 assures that the system returns to ambient pressure preparatory to opening lid 37 of housing 10 for removal of the filter cartridge. When the pipes of the system are at atmospheric pressure, top lid 37 of the housing 10 will be easily removable without any danger to operating personnel.

Figure 2B:
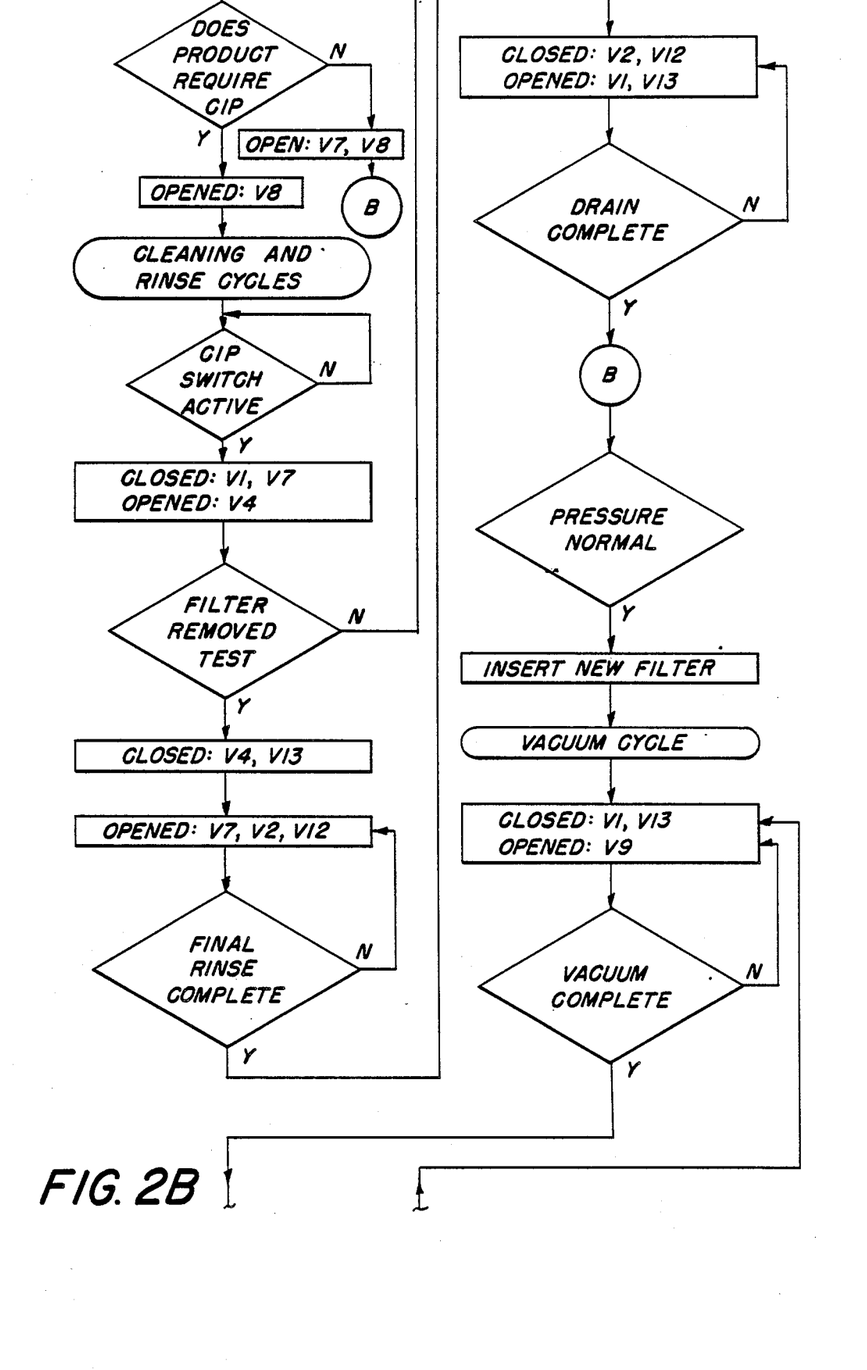

The removal of the housing lid 37 and concomitant removal of the filter is designated at the bottom in the left column of the flow chart in FIG. 2A. At this point, the microcode resident in the CPU 13 requires that a decision be made as to whether the apparatus 8 requires a CIP comprising a clean and rinse cycle because of a residue left by the previously filtered product. If the decision is that the product does not require a CIP the valves V7, V8 are opened and the cycle reverts to B the right side of the flow chart in FIG. 2B. On the other hand, if the apparatus 8 does require a CIP, the cleaning and rinse cycles are initiated by opening valve V8. The cleaning and rinse cycles are initiated by the microcontroller 20 through the CIP microcoded switch. If the CIP switch is not active the system will continuously loop but this will not occur in this type of configuration because the microcontroller 20 is committed to perform a CIP. If the CIP switch is active, valve V4 is opened and valves V1, V7 are closed. Valve V4 was previously in a closed state after completion of the drain cycle, whereas, valves V1, V7 were previously opened at the initiation of the drain cycle. After valves V1, V4, V7 are engaged as above stated, a microcoded decision point is reached which will allow a test to be executed prior to initiating the cleaning cycle as to whether the filter has been removed and not inadvertently left in housing 10. If the filter was inadvertently left in housing 10 a back pressure as detected by the pressure sensor 46 would be created in the pipes of the system upon allowing Compressed Air to flow. If the filter has not been removed, the microcode stored in the EEPROM 19 causes the cycle to revert to closing valves V4 and opening V1 to allow the back pressure to return to an ambient condition through the automatic bleed valve 32 as seen on the flow chart at the bottom of the left hand column in FIG. 2A. If the filter has been removed the microcode causes the microcontroller 20 to begin the CIP cycle of the housing 10 as well as its associated piping by closing valves V4, V13 and opening valves V7, V2 and V12. Valves V4, V13 were respectively opened prior in the operation during the filter removal test and upon initiation of the drain cycle. The valve V8 located in the right descending pipe 56 from housing 10 was also previously opened at the beginning of the drain cycle; and in this time frame, valves V1, V3, V5, V6, V10 and V11 are also closed in view of the execution of the previous normal operation cycle. The apparatus 8 is now conditioned by the microcontroller 20 to begin the cleaning and rinse cycle by allowing the Cleaning Liquid to enter pipe 30 connected to the filter housing 10 through pipe extension 31. The Cleaning Liquid then passes through the input and output pipes 16, 18 and is pumped through pipes 54, 56, descending pipe 59 and returns to the Cleaning Liquid Return through open valve V12 positioned in pipe extension 55. The Cleaning Liquid by means of the above described flow path causes the filter housing 10 and related piping to be cleansed so that any contaminants and residues are removed from the system. Cleaning of valves V5 and V6 may be performed as part of the cleaning of the industrial manufacturing system 9, or as a part of the cleaning of the apparatus 8 utilizing additional piping and valves(not shown) or a combination thereof. Other valves (not shown) also control supply sources (not shown) which store cleaning and rinsing liquids for the CIP cycle. A decision point is positioned in the flow chart for executing the next step in the cycle as determined by whether the rinse is completed or incomplete based upon the output signal produced by the conductivity probe 53. If the final rinse is not complete the cycle will allow valves V2, V7 and V12 to remain open to allow continuation of the CIP process. However, when the final rinse is completed valves V2 and V12 will be closed to terminate the CIP cycle and valves V1, V13 are opened to allow draining of the system by permitting the piping to vent to the atmosphere through the automatic bleed valve 32. Completion of the drain function will cause the cycle to revert to a B mode of the flow chart as indicated in a right column of FIG. 2B, whereas, if drainage is not complete, valves V1 and V13 will remain open. The completion of the drainage cycle is tested by use of the pressure probe 46.

The B mode begins with a decision point with respect to whether the pressure is normal as determined by the pressure probe 46. Since the valves V1 and V13 remain open the pressure within the piping must be at ambient or atmospheric pressure to allow for easy removal of the housing lid 37. If the pressure is not normal after a period of time there is a malfunction in the apparatus 8 and maintenance is required. If the pressure is normal a filter cartridge is inserted into the housing 10. A vacuum cycle is initiated to remove all moisture and air by opening valve V9 and at the same time valves V1 and V13 are closed. The opening of valve V9 in line 49 allows the system to be connected to a Vacuum Source for drawing down the pressure within the system to a negative value so that all moisture and air are drawn out of the system. At this time in the cycle, valves V7 and V8 are the only other valves that are open to allow the vacuum to penetrate all locations within the piping until the negative pressure reaches approximately 1 p.s.i.a. as determined by the pressure probe 46. The flow chart again indicates a decision point at the bottom of the right column of FIG. 2B where if the vacuum process is not completed by reaching the designated negative pressure, the vacuum cycle continues until it is reached. Once the value of approximately 1 p.s.i.a is reached evacuation is completed.

Figure 2C:
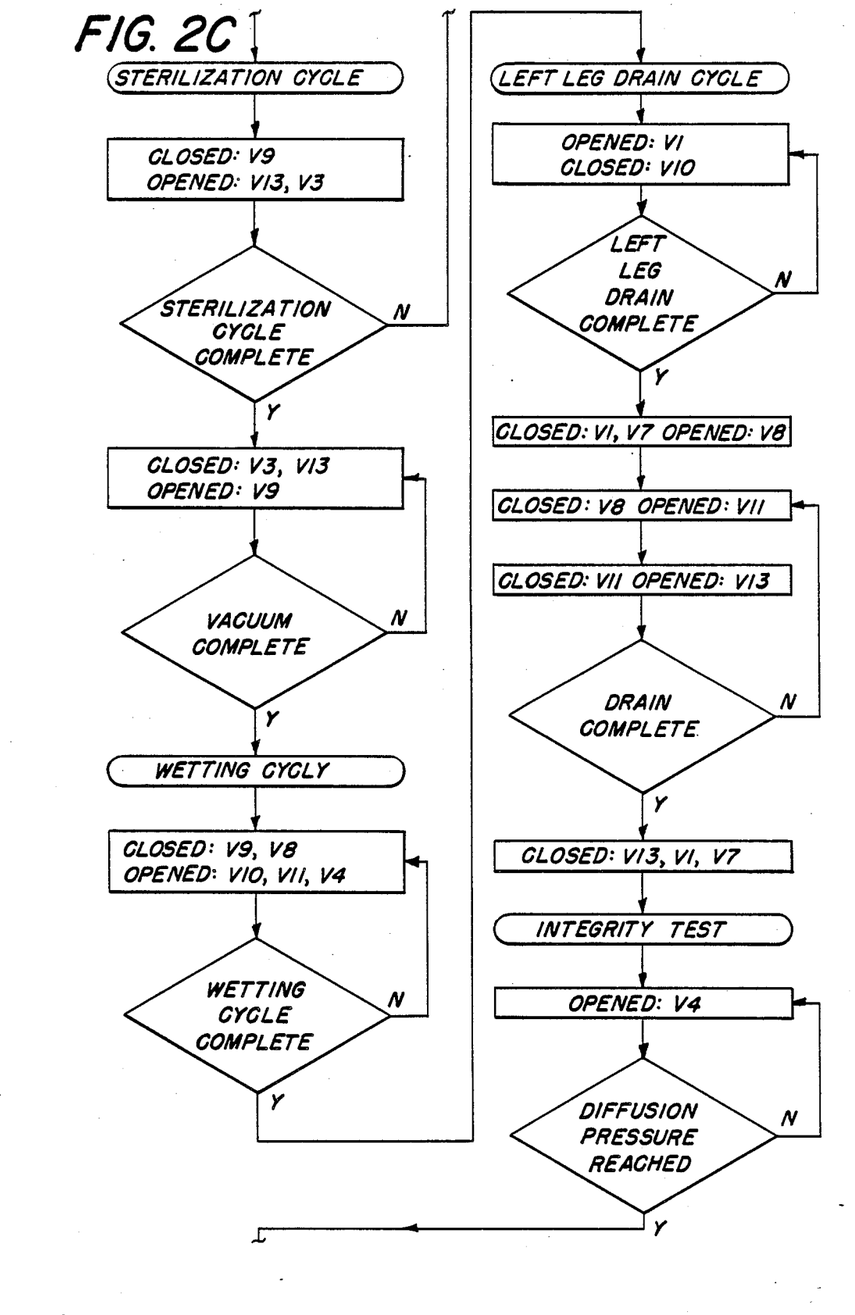

The flow diagram as seen in the left column of FIG. 2C indicates that once evacuation is completed the microcontroller 20 automatically causes apparatus 8 to initiate sterilization of the filter cartridge positioned within housing 10. The SIP is begun by closing vacuum valve V9 and opening proportional valves V3, V13; also, all other valves are closed during the performance of this cycle. The proportional opening of valves V3, V13 allows a certain amount of saturated steam into the system until it reaches sterilization temperature for a designated time period. The saturated steam is utilized for sterilizing the entire apparatus 8. The flow chart indicates a decision point which delineates two options as determined by whether the sterilization cycle is completed or not. If sterilization is not complete within a designated time the microprocessor 20 transfers the operation to the right column of the flow chart in FIG. 2B where the vacuum cycle is re-initiated. Sterlization of valves V5 and V6 may be performed as a part of the sterilization of the industrial manufacturing system 9 or as a part of the sterilization of the apparatus 8 utilizing additional piping and valves (not shown) or a combination thereof. However, if the sterilization cycle is completed the vacuum cycle is initiated by the opening of valve V9 and closing steam valve V3 and drain valve V13 as indicated on the flow diagram of FIG. 2C. The vacuum operation is performed after sterilization in order to cause the piping to be completely dry. At this point in the cycle the filter cartridge is completely sterilized. SIP occurs at this point prior to IT, which will be discussed in later paragraphs, in view of the possibility that the sterilizing might damage the filter cartridge.

After evacuation, the system initiates the wetting cycle with a liquid such as alcohol by closing valves V8, V9 and opening valves V1, V10 and V11. Valve V7 in the left leg 54 to housing 10 remains open as indicated on the flow chart of FIG. 2B at the beginning of the final rinse cycle; however, valve V8 is closed because it is essential that no wetting liquid enter the housing 10 on the output side to contaminate the filter that has just been sterilized. All other valves, namely, V2, V3, V4, V5, V6, V12 and V13 are closed through the operation of previous cycles. The wetting liquid therefore is forced from the wetting tank 66 into the input line of the filter housing 10 by compressed air which flows through line 33 and through the open valve V10 and line 43. The wetting liquid flows through open valve V11, line 47, line 59 and left input line 54 through open valve V7. Compressed Air does not escape through the open valve V1 due to closure of valve V4. Safety valve 68 is utilized with wetting tank 66 to prevent tank over pressures.

The microcontroller 20 next causes the apparatus 10 to execute one of two options depending upon whether the wetting cycle is complete. If the wetting cycle is not complete, the system will continue with the wetting cycle; if the wetting cycle is completed, a left leg drain cycle is begun as indicated on the top of the right column of the flow chart in FIG. 2C. According to the operation, nonsterile alcohol must be drained from the system first and is initiated by closing three-way valve V10 which causes wetting liquid tank 66 air to be vented. The non-sterile alcohol is drained back into the tank through the open valves V7 and V11. Valve V1 is opened to provide air venting. The microcontroller 20 is faced with a decision point for setting forth various control paths as determined by whether the left leg drain is complete. As long as the left leg drain is not complete, the valve V10 remains closed and V11 open. When it is determined that the left leg drain through valve V7 is complete as determined by elapsed time generated through an internal clock of the microcontroller 20, the sterilized wetting liquid is drained through the right leg 56 by opening valve V8 and closing valves V7, V11. The sterile wetting liquid will then accummulate in lines 56, 59. The flow chart indicates that valve V8 is again closed and valve V11 opened where some of the accummulated wetting liquid returns to the tank 66. After this operation, valve V11 is next closed and valve V13 opened to allow any sterile wetting liquid to drain through the drain terminal 57. The microcontroller 20 then allows a decision to be resolved on whether the drain operation is completed or not. If the drain operation of the sterile wetting liquid is not completed the system causes valve V11 to again open whereas valve V8 remains closed to allow the wetting liquid to return to the tank if possible; the operation then continues up to the decision point. If the right leg drain is completed valves V1, V7 and V13 are closed as well as all the remaining valves V2, V3, V4, V5, V6, V8, V9, V10, V11 and V12 are all closed and the automatic wetting cycle is completed.

The microcontroller 20 next instructs the apparatus 8 to begin IT or whether the sterilized filter is capable of preventing contaminates from entering the output product line 18. The first step as indicated at the bottom of the right column of the flow chart operation in FIG. 2C is to open valve V4 to allow Compressed Air to build up pressure in the housing 10 and filter after the sterilized filter has been wetted by the liquid. The pressure within the filter housing 10 is monitored by the pressure probe 46 and the compressed air valve V4 remains in an open state until the pressure reaches an appropriate value. When this pressure is reached the microcontroller 20 closes the valve V4 and the pressure drop within the system is monitored for a specified time period in order to determine the diffusion rates through the filter. If the pressure drops rapidly it is evident that a faulty filter cartridge is being utilized and hence does not pass the IT. This test is programmed into the microcode and stored within the EEPROM 19. It is known that for a certain wetting agent, filter designation and capillary action the pressure should hold for a specified time period. The diffusion rate can be calculated by the microcontroller 20 since the filter housing 10 has a known volume and the pressure drop through the filter is monitored over a precise time period. If the pores of the filter are too large, air will diffuse rapidly through the device and will exceed the maximum allowable diffusion rate of the filter. The microcode can store this maximum diffusion rate value for a designated filter to determine whether it is valid or should be rejected.

Figure 2D:
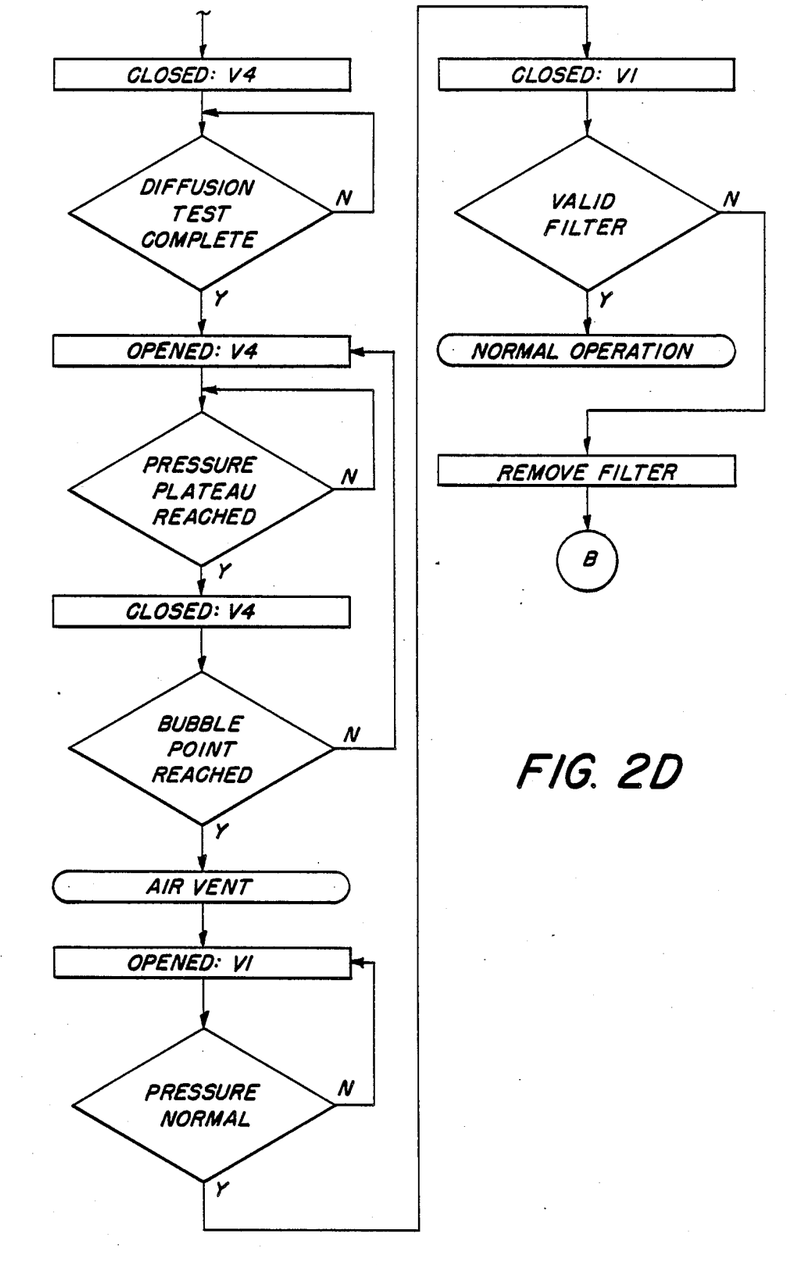

When the diffusion test is completed as shown in the left column of the flow chart of FIG. 2D, the compressed air valve V4 is again opened in order to begin a bubble point test of the filter. The diffusion test was initiated in the system of apparatus 8 to monitor the pressure for a precise time to determine how air diffuses or disseminates through the filter, whereas, the bubble point test is intended to determine if the filter maintains a specified pressure. As compressed Air is blown into housing 10 through pipe 30 during the bubble point test the pressure begins to increase as monitored by the analog signal received from the pressure probe 46. At a certain pressure e.g., 20 p.s.i.a. the decision point on the flow chart indicates whether a plateau has been reached. The pressure is monitored at this plateau for several minutes to see if it remains relatively constant and only drops by its diffusion rate. If the filter cartridge maintains this testing level and the bubble point has not been reached as indicated by the diamond decision point on the flow chart, the valve V4 is opened again to continue to raise the pressure applied to the filter. As another pressure plateau is reached, the pressure drop is again monitored to see if the drop is only due to its diffusion rate. This operation continues until the pressure reaches e.g., 28 p.s.i.a. where a sudden drop of pressure is indicated. This is considered to be the bubble point pressure.

Returning to the left column of the flow chart of FIG. 2D it is shown that upon reaching the bubble point pressure, the automatic air bleed 32 is accessed by opening valve V1 and the internal pressure within the system is allowed to return to atmospheric pressure. When the system reaches this pressure valve V1 is closed as indicated in the right column of the flow chart. Based upon the diffusion rate and the bubble point value the microcontroller 20 determines if the filter is valid. If the filter has been determined to be valid by the system, the microcontroller 20 returns the operation to normal as indicated at the top of the left column of the flow chart in FIG. 2A. However, if the filter was not valid as indicated by the IT, the filter has to be removed and the microcontroller 20 causes the system to return to B in the flow chart in the right column of FIG. 2B.

The previous description delineated in the flow chart was applicable to the automatic operation of CIP, SIP and IT with respect to a liquid product. In the event however that the product to be sterilized or purified is a gas such as air as previously discussed, the flow chart as shown in the left column of FIG. 2A follows a different path. With reference to the decision point as indicated by the diamond, if the product is not a liquid the flow chart follows A which proceeds along a path beginning at the top of FIG. 3. When the product to be sterilized or purified is a gas the microcontroller 20 causes an initiation of a vent cycle by closing respective product input and output valves V5, V6 and opening valve V1 to allow the system to revert to atmospheric pressure through air bleed valve 32. The pressure within the system is monitored by the pressure sensor 46 until it reaches ambient pressure when it is safe to remove the lid 37 from housing 10. The decision point indicates that as long as the system is not at atmospheric pressure, valve V1 will remain open and therefore allow venting through bleed valve 32. Once atmospheric pressure is reached, the lid 37 can be lifted and the filter removed. A decision point is reached in the flow path under control of the microcode stored in the EEPROM 19 as to whether the CIP cycle should or should not be executed. If the gas is one which leaves a residue within the system when respectively entering and leaving through valves V5, V6, a CIP cycle is required; however, if a product such as air is being sterilized a CIP may not be required and valves V7 and V8 are opened to open legs 54, 56. The system then reverts in the flow chart to B the right column of FIG. 2B. If the gas previously sterilized or purified leaves a residue within the system, CIP is required and valve V8 is opened to open right pipe 56 and the operation continues as set forth in the flow chart in the left column of FIG. 2B.

It should be understood by those skilled in the art that the various pneumatic and electrical lines interconnecting the various structural elements depicted in the schematic of FIGS. 1 and 2 are intended to convey the operational aspects of the invention for ease of understanding; hence, it should be readily understood therefore that the various valves, switches, data transmission and reception by the microcontroller 20 will be electrically and mechanically isolated from similarly operated devices for proper operation.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A filter apparatus to purify a gas or liquid for use in an industrial means comprising:
    (a) a filter means for housing a filter integrally connected with said industrial means;
    (b) means connected to said filter means for automatically testing said filter in situ by integrity testing in-place, sterilizing in-place and cleaning in-place; and
    (c) means for controlling said in-place means singly, in combination or in totality.

2. The apparatus in accordance with claim 1 wherein said means for automatically integrity testing, sterilizing and cleaning further comprises a microcontroller for controlling said in-place means.

3. The apparatus in accordance with claim 2 wherein said microcontroller includes means for storing instructions for automatically performing said in-place means in a sequential manner.

4. The apparatus in accordance with claim 3 wherein said means for performing said in-place means include means for determining temperature, conductivity and pressure information in analog form which is received by said microcontroller in digital form for producing control output signals.

5. The apparatus in accordance with claim 4 wherein said analog temperature, conductivity and pressure information is converted into digital information by analog-to-digital means.

6. The apparatus in accordance with claim 4 wherein said microcontroller is adapted to receive continuous digital input signal information emanating from said in-place means and further comprising:
    an automatic gas venting means, a compressed air means, a cleaning liquid supply and return means, a wetting liquid supply and return means, input and output product means, a vacuum supply means, a drain means, a steam supply means, and said plurality of digital input information causing said microcontroller to produce control output signals.

7. The apparatus in accordance with claim 1 wherein said automatic in situ integrity testing comprises means for determining whether the pore dimensions of said filter are oversized.

8. The apparatus in accordance with claim 1 wherein said integrity testing comprises:
    means for determining the diffusion rate of said filter.

9. The apparatus in accordance with claim 1 wherein said integrity testing comprises:
    means for conducting a bubble point test on said filter.

10. The apparatus in accordance with claim 1 wherein said in-place sterilization further comprises means for applying saturated steam to said filter, housing and all connected internal piping means.

11. The apparatus in accordance with claim 10 wherein said automatic sterilizing in place is controlled by a microcontroller.

12. The apparatus in accordance with claim 10 wherein said in-place means includes means for vacuuming said internal piping, filter and housing for drying said filter, housing and connected piping means.

13. The apparatus in accordance with claim 12 wherein said in-place means includes means connected to said housing for wetting the filter prior to integrity testing.

14. The apparatus in accordance with claim 13 wherein said integrity testing in-place occurs after wetting the filter before or alternatively, after sterilization and vacuuming in-place.

15. The apparatus in accordance with claim 2 wherein said microcontroller includes means for determining whether said in-place means are to be conducted upon said gas or liquid.

16. The apparatus in accordance with claim 15 wherein said microcontroller causes said gas venting means to become operative if the previous medium was a gas, and causes said drain means to become operative if the previous medium was a liquid prior to performing said in-place means.

17. The apparatus in accordance with claim 16 wherein said compressed air means is activated by said microcontroller in order to enhance drainage of said liquid.

18. The apparatus in accordance with claim 17 wherein said in-place means includes means for venting the filter housing to atmospheric pressure to allow safe removal of a previously used filter.

19. The apparatus in accordance with claim 17 wherein said micro controller means causes said cleaning in-place to occur due to a residue remaining in said filter means by a previously filtered product.

20. The apparatus in accordance with claim · 19 wherein said in place means for causing a pressure to be detected prior to initiating a cleaning in-place, and said pressure determining whether a previously used filter is still retained in said filter housing means.

21. A method for determining suitability of a filter in a filter apparatus means for a gas or liquid medium which is integrally connected in an industrial unit comprising the steps of:
 (a) cleaning said apparatus in-place;
 (b) sterilizing said filter and apparatus in-place;
 (c) integrity testing said filter in-place; and
 (d) controlling said cleaning, sterilizing and integrity testing either singly, in combination or in totality.

22. The method in accordance with claim 21 wherein said integrity testing step further comprises:
 determining the diffusion rate of air through said filter.

23. The method in accordance with claim 22 wherein said integrity testing step further comprises:
 conducting a bubble point test on said filter.

24. The method in accordance with claim 21 wherein said in-place step comprises the further steps of:
 automatically wetting, draining and drying of the filter and apparatus means.

25. The method in accordance with claim 24 wherein said sterilizing step is performed in conjunction with said integrity test step.

26. The method in accordance with claim 24 wherein said cleaning step is performed in conjunction with said integrity and sterilizing steps.

27. A filter apparatus to purify a gas or liquid medium for use with an industrial means:
 (a) a filter means for housing a filter integrally connected with said industrial means;
 (b) first, second and third openings located in said filter means;
 (c) means directly connected to said first and second openings for transferring said gas or liquid medium in a purified state to said industrial means after passing through said filter;
 (d) means connected to said first, second and third openings for automatically testing said filter in situ by respectively cleaning in-place, sterilizing in-place and integrity testing in-place; and
 (e) said in-place means being performed singly, in combination or in totality.

28. The filter apparatus in accordance with claim 1 wherein said in-place means further comprises:
 (a) means for automatically wetting said filter in-place; and
 (b) said wetting means being connected to said filter housing to avoid contaminating said filter after being sterilized in-place.

* * * * *

REEXAMINATION CERTIFICATE (3230th)
United States Patent [19]

Kononov

[11] B1 4,881,176

[45] Certificate Issued Jun. 17, 1997

[54] FILTER ANALYZING SYSTEM

[75] Inventor: Anthony Kononov, Sumneytown, Pa.

[73] Assignee: Thokon Corporation

Reexamination Request:
No. 90/003,071, May 20, 1993

Reexamination Certificate for:
Patent No.: 4,881,176
Issued: Nov. 14, 1989
Appl. No.: 147,331
Filed: Jan. 22, 1988

[51] Int. Cl.$^6$ .......................... G06F 19/00; G01M 15/08
[52] U.S. Cl. .................. 364/500; 55/271; 73/38; 95/278; 210/85; 364/502
[58] Field of Search .................... 364/468, 500, 364/502, 510, 468.24; 73/38, 40, 40.7, 45.2; 210/85, 143, 295, 339; 55/259, 270–274, 279, 282, 285, 301; 96/109–117; 95/273, 278, 1

[56] References Cited

U.S. PATENT DOCUMENTS

| | | |
|---|---|---|
| 4,128,004 | 12/1978 | Caron et al. ................. 73/38 |
| 4,449,392 | 5/1984 | Huschke ..................... 73/40 |
| 4,515,007 | 5/1985 | Herman ...................... 73/38 |
| 4,614,109 | 9/1986 | Hofmann ..................... 73/38 |
| 4,701,861 | 10/1987 | Kauke ....................... 364/502 |

OTHER PUBLICATIONS

"New Manufacturing System for Program–Controlled Production of Parenterals" P. Wynen et al; vol. 46(11), pp. 1171–1174 (1984).

*Primary Examiner*—Joseph Ruggiero

[57] ABSTRACT

An in situ apparatus and method to clean filter housing and related piping, sterilize and perform integrity testing of a filter for purifying a gas or liquid to be used within various industrial environments such as chemical, pharmaceutical, food processing or semiconductor manufacture. The in situ facility of the filter apparatus in the manufacturing environment is automatically performed by use of an electrical controller which enables the method of operation to be executed in a desired sequence.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 27 is confirmed.

Claims 1, 3, 13, 14, 21, 24 and 28 are determined to be patentable as amended.

Claims 2, 4–12, 15–20, 22, 23, 25, and 26, dependent on an amended claim, are determined to be patentable.

New claim 29 is added and determined to be patentable.

1. A filter apparatus to purify a gas or liquid for use in an industrial means comprising:
   a.) a filter means [for] *including a* housing *for* a filter integrally connected with said industrial means;
   b.) means connected to said filter means for automatically testing said filter in situ by integrity testing in-place, sterilizing in-place, and cleaning in-place [and];
   c.) *means further connected to said filter means for automatically wetting said filter in-place prior to integrity testing, and*
   [c] *d.*) means for controlling *any combination of* said in-place means [singly, in combination or in totality] *in a desired sequence automatically as required by said industrial means.*

3. The apparatus in accordance with claim 2 wherein said microcontroller includes means for storing instructions for automatically performing said in-place means in [a sequential manner] *said desired sequence.*

13. The apparatus in accordance with claim [12] / wherein said *further connected* in-place means includes means connected to said housing for wetting the filter prior to integrity testing.

14. The apparatus in accordance with claim [13] / wherein said integrity testing in-place occurs after wetting the filter [before or alternatively,] after sterilization and vacuuming in-place.

21. A method for determining suitability of a filter in a filter apparatus means for a gas or liquid medium which is integrally connected in an industrial unit comprising the steps of:
   a.) cleaning said apparatus *means* in-place *automatically*;
   b.) sterilizing said filter and apparatus *means* in-place *automatically after said cleaning step*;
   c.) *wetting said filter in-place automatically after said sterilizing step;*
   [c] *d.*) integrity testing said filter in-place *automatically after said wetting step*[;] and,
   [d] *e.*) controlling said cleaning, sterilizing, and *wetting with* integrity testing [either singly, in combination, or in totality] *to provide any combination of said in-place means in a desired sequence automatically as required by said industrial unit.*

24. The method in accordance with claim 21 wherein said in-place step comprises the further steps of:
   automatically [wetting,] draining and drying of the filter and apparatus means.

28. The filter apparatus in accordance with claim 1 wherein said in-place [means further comprises:
   (a) means for automatically wetting said filter in place; and
   (b) said] wetting means [being] *is* connected to said filter housing to avoid contaminating said filter after being sterilized in-place.

29. *A filter apparatus to purify a gas or liquid for use in an industrial means comprising:*
   a.) *a filter means including a housing for a filter integrally connected to said industrial means;*
   b.) *means connected to said filter means for automatically cleaning said filter means in-place;*
   c.) *means further connected to said filter means for automatically sterilizing said filter in-place; and*
   d.) *means further connected to said filter means for automatically wetting said filter in-place;*
   e.) *means further connected to said filter means for automatically integrity testing said filter in-place, and*
   f.) *means for controlling any combination of said in-place means in a desired sequence automatically as required by said industrial means.*

* * * * *